United States Patent [19]

Gunter

[11] 4,449,294
[45] May 22, 1984

[54] APPARATUS FOR JOINING TWO ABUTTING METAL MEMBERS TOGETHER AND METHOD OF MAKING SUCH APPARATUS

[75] Inventor: James C. Gunter, Greensburg, Pa.

[73] Assignee: Robertshaw Controls Company, Richmond, Va.

[21] Appl. No.: 372,630

[22] Filed: Apr. 28, 1982

[51] Int. Cl.³ .................. B23P 11/00; B23P 19/00; B23Q 7/00
[52] U.S. Cl. .................................. 29/792; 29/798; 29/432; 29/563
[58] Field of Search .......... 29/792, 798, 432, 432.1, 29/33 M, 33 J, 509, 37 R, 243.5, 563

[56] References Cited

U.S. PATENT DOCUMENTS

| | | | |
|---|---|---|---|
| 3,726,000 | 4/1973 | Hafner | 29/432 |
| 3,981,064 | 9/1976 | Hafner | 29/432 |
| 4,035,901 | 7/1977 | Lux et al. | 29/243.5 |
| 4,059,897 | 11/1977 | Marquis | 29/432.1 |
| 4,152,566 | 5/1979 | Mägerle | 29/792 |
| 4,173,815 | 11/1979 | Lux et al. | 29/432.1 |
| 4,312,122 | 1/1982 | Gunter | 29/432.1 |
| 4,373,129 | 2/1983 | Sugalski et al. | 29/792 |

Primary Examiner—Howard N. Goldberg
Assistant Examiner—Steven Nichols
Attorney, Agent, or Firm—Candor, Candor & Tassone

[57] ABSTRACT

An apparatus is provided for joining two metal members together with a lancing and staking operation that comprises the lancing and forming of a part of one of the members through an unblanked part of the other of the members and thereafter the staking of the formed part of the one member to an adjacent surface of the other member to secure the members together in abutting relation, the apparatus having a punch and a reciprocating head that cooperate together to form the lancing and staking operation on the members and having an indexible carrier for indexing the members to the head for the lancing and staking operation thereon and then away from the head after the lancing and staking operation, the carrier supporting and carrying the punch therewith. A method of making such apparatus is also provided.

30 Claims, 13 Drawing Figures

APPARATUS FOR JOINING TWO ABUTTING METAL MEMBERS TOGETHER AND METHOD OF MAKING SUCH APPARATUS

BACKGROUND OF THE INVENTION

1. Field of the Invention

This invention relates to an improved apparatus for lancing and staking two metal members or the like together, such as for forming electrical switch assemblies or the like, as well as relates to a method of making such an apparatus.

2. Prior Art Statement

It is known to provide an apparatus and method for joining two metal members together with a lancing and staking operation that comprises the lancing and forming of a part of one of the members through an unblanked part of the other of the members and thereafter the staking of the formed part of the one member to an adjacent surface means of the other member to secure the members together in abutting relation, the apparatus having a punch and a reciprocating head that cooperate together to perform the lancing and staking operation on the members.

For example, see the following item:
(1) U.S. Pat. No. 4,035,901—Lux et al.

The lancing and staking apparatus of Item (1) above has a single reciprocating head provided with a first section that performs the lancing and forming step with the punch on a first stroke of the head and provided with a second section that forms the staking step with the punch on a second stroke thereof.

It is also known to lance and form a part of an electrical terminal member through an unblanked part of an end of a switch blade member and thereafter stake that part of the terminal member to the other side of the switch blade member to secure the members together to provide an electrical switch assembly for an electrical switch construction or the like.

For example, see the following items:
(2) U.S. Pat. No. 4,059,897—Marquis
(3) Above Item (1)

It is also known to provide a method and apparatus for automatically forming electrical switch assemblies each of which comprises a terminal member and a switch blade secured together at a station in the apparatus by the aforementioned lancing and staking operation.

For example, see the following item:
(4) U.S. Pat. No. 4,312,122—Gunter

SUMMARY OF THE INVENTION

It is one feature of this invention to provide an improved apparatus for joining two metal members together with a lancing and staking operation.

In particular, it was found according to the teachings of this invention that the punch of a lancing and staking apparatus could be made to be movable toward and away from the reciprocating head thereof by forming part of an indexible table or carrier means so that the lancing and staking apparatus could perform such lancing and staking operation while the punch therefor could be utilized with a holding means of the carrier means to index the lanced and staked members to other stations in the apparatus to have other operations performed thereon.

For example, one embodiment of this invention provides an apparatus for joining two metal members together with a lancing and staking operation that comprises the lancing and forming of a part of one of the members through an unblanked part of the other of the members and thereafter the staking of the formed part of the one member to an adjacent surface means of the other member to secure the members together in abutting relation, the apparatus having a punch and a reciprocating head that cooperate together to perform the lancing and staking operation on the members and having an indexible carrier means for indexing the members to the head for the lancing and staking operation thereon and then away from the head after the lancing and staking operation. The carrier means supports and carries the punch therewith whereby the punch moves with the carrier means relative to the head.

Accordingly, it is an object of this invention to provide an improved apparatus for joining two metal members together with a lancing and staking operation, the apparatus of this invention having one or more of the novel features of this invention as set forth above or hereinafter shown or described.

Another object of this invention is to provide a method for making such an apparatus, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
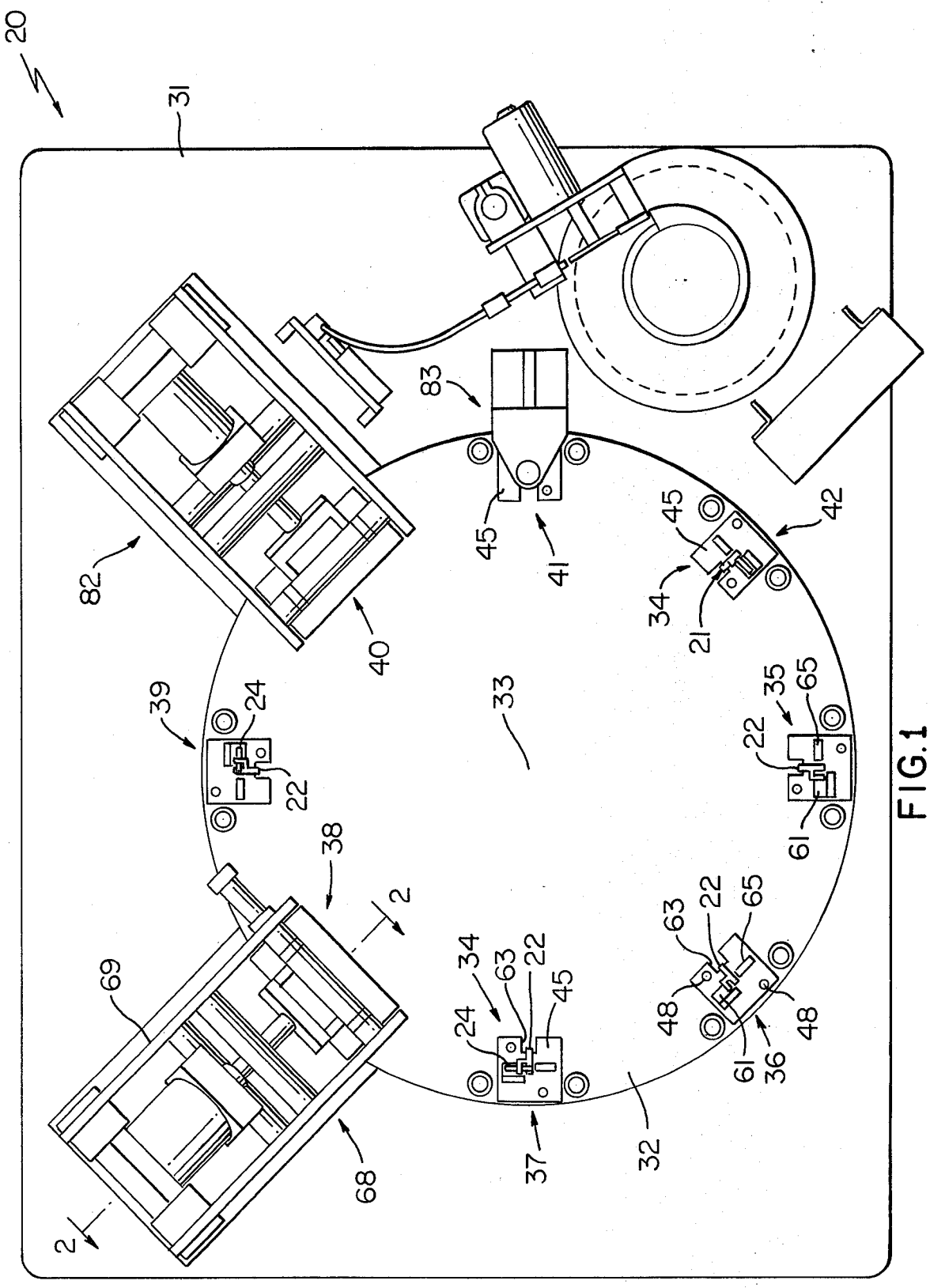
FIG. 1 is a top schematic view of the improved apparatus and method of this invention.

While the various features of this invention are hereinafter described and illustrated as being particularly adapted to provide a means for forming an electrical switch assembly, it is to be understood that the various features of this invention can be utilized singly or in various combinations thereof to provide a securing means for other members as desired and whether such other members are metal members or of other suitable material or combinations of materials as desired.

Therefore, this invention is not to be limited to only the embodiment illustrated in the drawings, because the drawings are merely utilized to illustrate one of the wide variety of uses of this invention.

Figure 7:
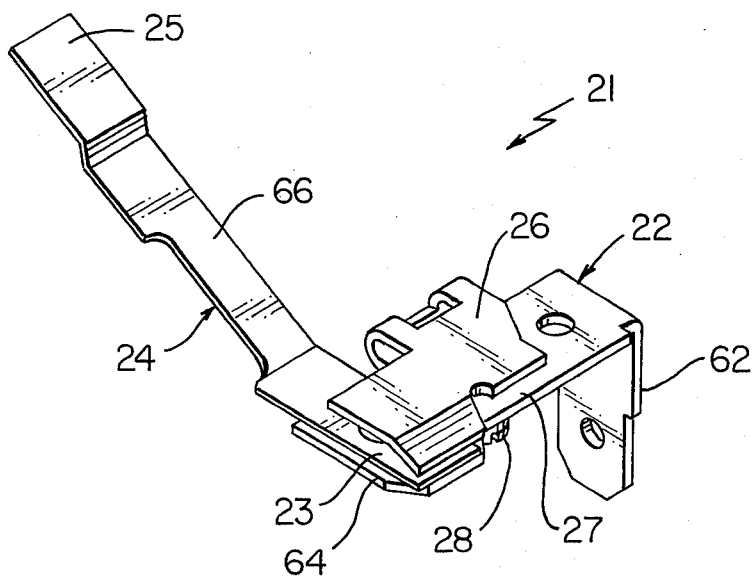
FIG. 7 is an enlarged perspective view illustrating the completed switch assembly of the two metal members formed by the method and apparatus of FIG. 1.

Referring now to FIG. 1, the improved apparatus and method of this invention to generally indicated by the reference numeral 20 and is utilized to form a plurality of electrical switch assemblies each of which is generally indicated by the reference numeral 21 in FIG. 7 and comprises a relatively thick terminal member 22 formed of metallic material secured to one end 23 of a relatively thin electrical switch blade 24 formed of metallic material and adapted to carry an electrical contact means (not shown) on the other end 25 thereof whereby the end 25 of the switch blade 24 is adapted to be carried in cantilevered fashion by the terminal member 22 to perform a contact switching function in a manner well known in the art.

The particular electrical switch assembly 21 is of the type fully disclosed and claimed in the co-pending patent application, Ser. No. 210,522, filed Nov. 26, 1980 and such co-pending patent application is being incorporated into this disclosure by this reference thereto for a discussion of the details of the structure of the assembly 21 and its use in a particular switch arrangement whereby such details need not be set forth in this disclosure.

Figure 13:
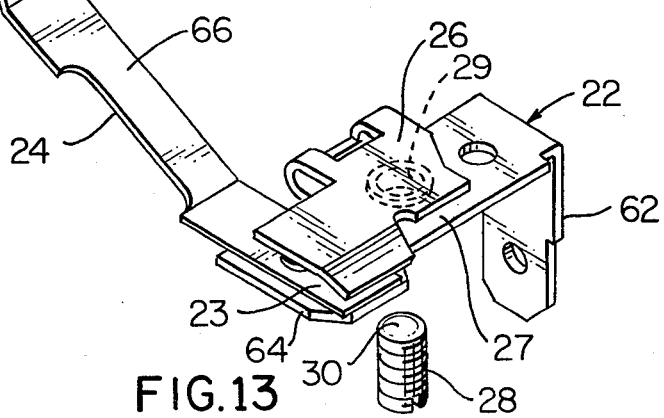
FIG. 13 is a view similar to FIG. 12 and illustrates how the calibration screw is fed into the assembly of FIG. 12 by the apparatus of FIG. 1 to form the completed assembly of FIG. 7.

However, it should be noted that the terminal member 22 has an integral arm portion 26 in FIG. 7 that is bent over a body portion 27 of the terminal 22 in a hinged manner and is adapted to be calibrated relative to the body portion 27 by an adjusting screw 28, FIGS. 7 and 13, threadedly disposed in a threaded or self threadable opening 29 in the body portion 27 of the terminal 22 and having its end 30 for engaging against the arm 26 so as to adjust the folded condition thereof relative to the body portion 27 for calibrating the switch assembly 21 as fully set forth in the aforementioned co-pending patent application.

The switch blade 24 and terminal member 22 are secured together in the apparatus 20 of this invention by a lancing and staking operation that is performed substantially in the manner set forth in the aforementioned U.S. Pat. Nos. 4,035,901 and 4,059,897 whereby these two U.S. Patents are also being incorporated into this disclosure by this reference thereto.

Referring now to FIG. 1, the improved apparatus and method 20 of this invention includes a main frame means 31 rotatably carrying an indexible table or carrier means 32 rotatable in an indexing manner about an axis 33 in a manner well known in the art and having a plurality of holding means 34 thereon for serially being indexed between stations 35, 36, 37, 38, 39, 40, 41 and 42 of the apparatus 20 wherein various operations can be performed on the members 22 and 24 held in the holding means 34 as will be apparent hereinafter.

Figure 2:
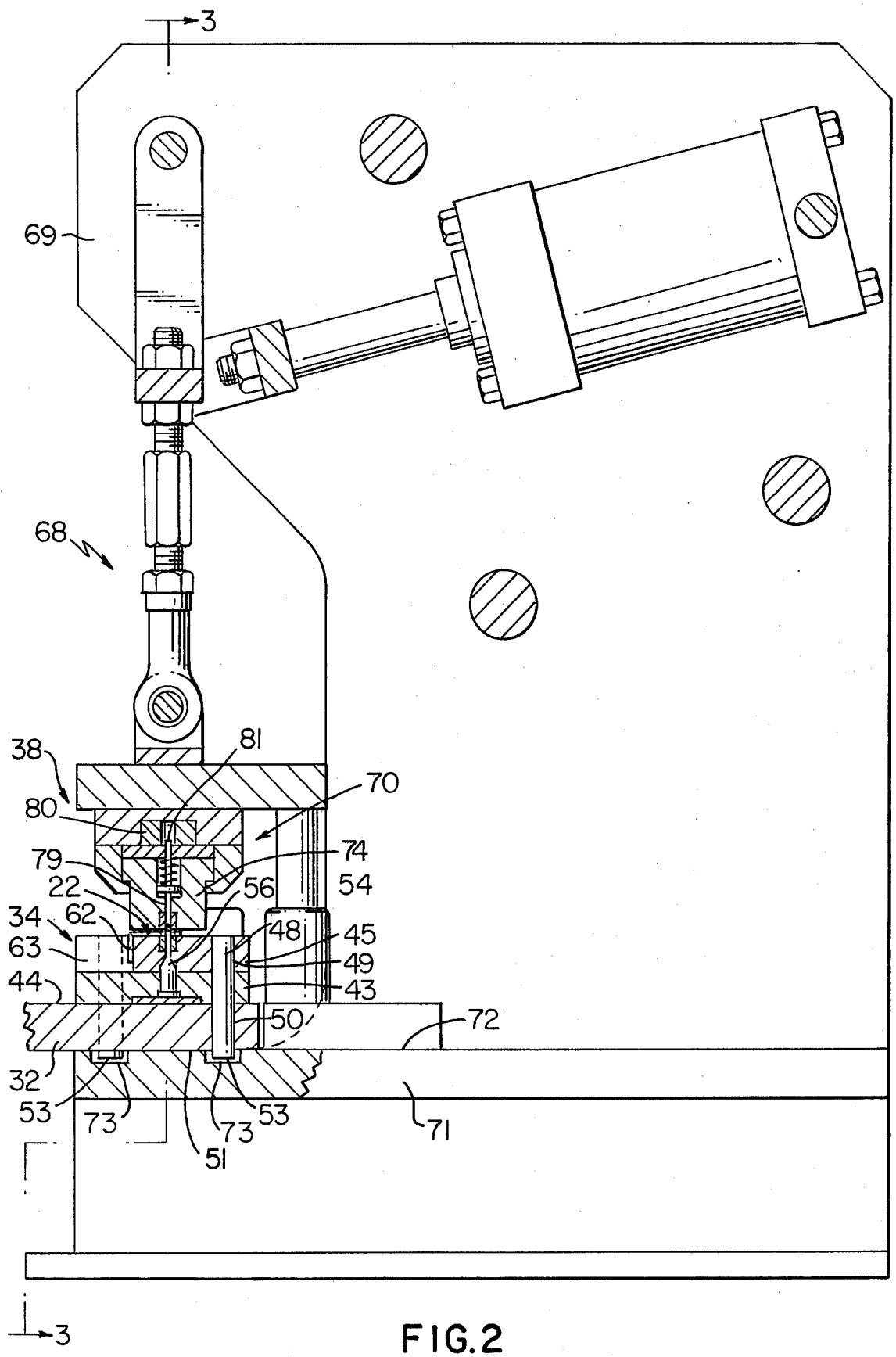
FIG. 2 is an enlarged fragmentary view, partly in cross section, of the lancing and staking section of the apparatus of FIG. 1 and is taken generally on the line 2—2 of FIG. 1.
Figure 3:
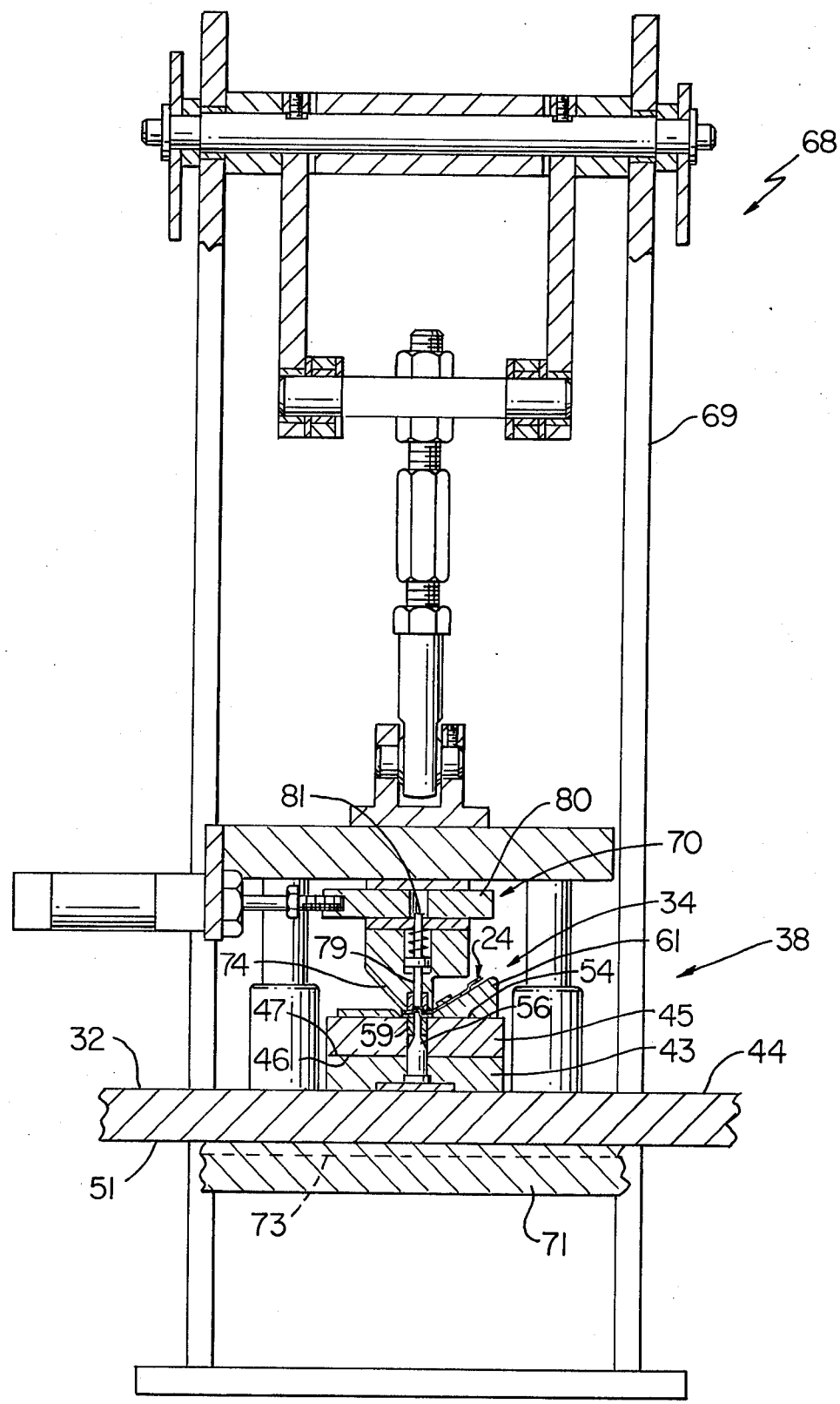
FIG. 3 is a fragmentary cross-sectional view taken on line 3—3 of FIG. 2.
Figure 4:
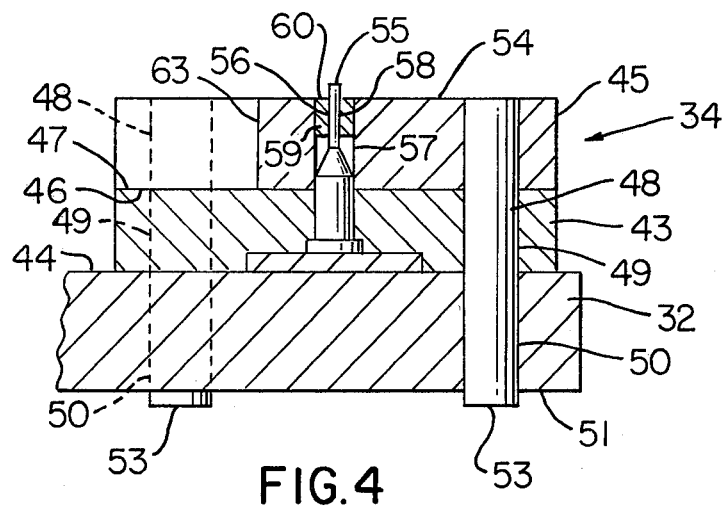
FIG. 4 is an enlarged fragmentary cross-sectional view of the punch and holding means of the lancing and staking section of FIGS. 2 and 3.

Each holding means 34 comprises a first block or plate 43 secured to the top surface 44 of the table or carrier means 32 in any suitable manner and a second block or plate 45 having a flat bottom surface 46 adapted to rest on a flat top surface 47 of the lower block 43 while being movable relative thereto because the top block 45 carries a plurality of posts 48 that are fixed to the upper block 45 and loosely pass through openings 49 in the lower block 43 as well as aligned openings 50 in the table or carrier means 32 so as to project below the lower surface 51 of the carrier means 32 when the upper block 48 has its bottom surface 46 resting against the top surface 47 of the lower block 43 as illustrated in FIGS. 2, 3 and 4.

Figure 5:
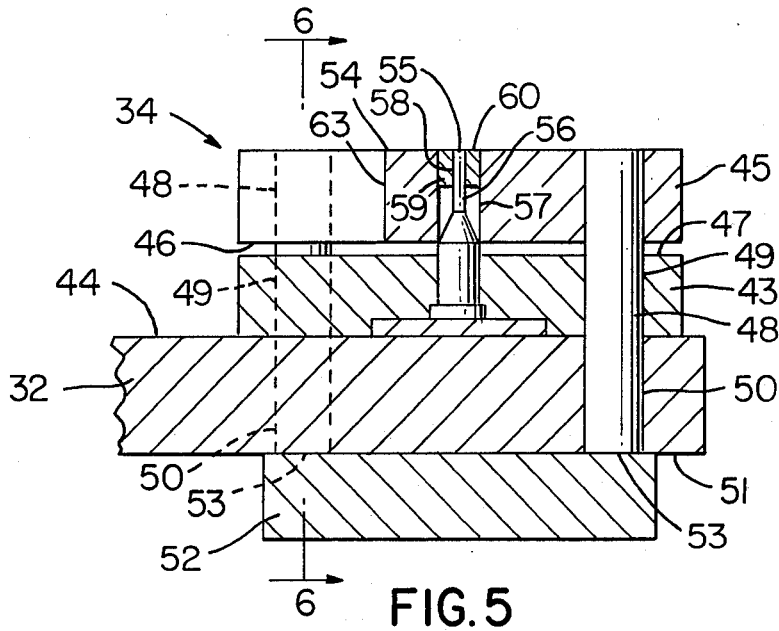
FIG. 5 is a view similar to FIG. 4 and illustrates the punch and holding means during a stripping operation thereof.
Figure 6:
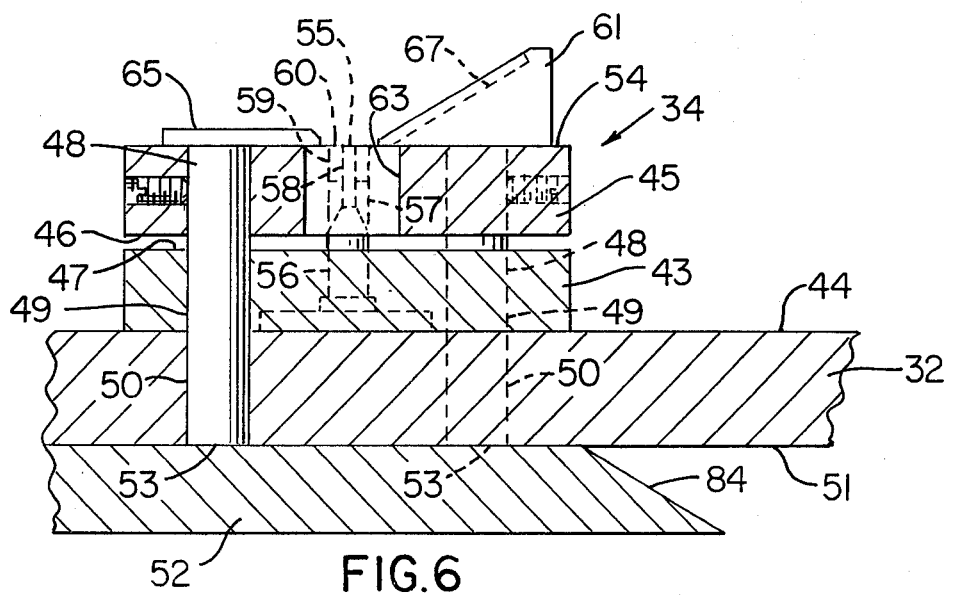
FIG. 6 is a fragmentary cross-sectional view taken on line 6—6 of FIG. 5.

However, when suitable cam means 52, FIGS. 5 and 6, engages against the lower free ends 53 of the posts 48 so as to move the same upwardly so as to be flush with the bottom surface 51 of the carrier means 32 as illustrated in FIGS. 5 and 6, the upper block 45 of the respective holding means 34 is moved upwardly relative to its lower block 43 so as to dispose the top surface 54 of the block 45 flush with the top surface 55 of a punch 56 that projects through an opening 57 in the block 45 and is carried by the lower block 43 so as to be nonmovable with the upper block 45 for a purpose hereinafter described. The upper end 55 of each punch 56 comprises a reduced portion 58 of the punch 56 which extends into a bearing means 59 that is carried by the respective upper block 45 in the opening 57 thereof so that the upper surface 60 of the bearing means 59 is substantially flush with the top surface 54 of the upper block 45 as illustrated in FIGS. 4 and 5.

Each upper block 45 of each holding means 34 has positioning means 61 carried on the upper surface 54 thereof for positioning and holding a switch blade 24 in such a position that the lower end 23 of the switch blade 24 is adapted to be disposed over the body portion 27 of a terminal member 22 that is disposed in the respective holding means 34 on top of the end 55 of the punch 56 and has its L-shaped leg 62 received in a cut-out 63 in the upper block 45 as illustrated in FIG. 1 with the end 64 of the body portion 27 of the terminal 22 being located by another positioning member 65 carried on the upper surface 54 of the upper block 45 as illustrated in the drawings.

Figure 8:
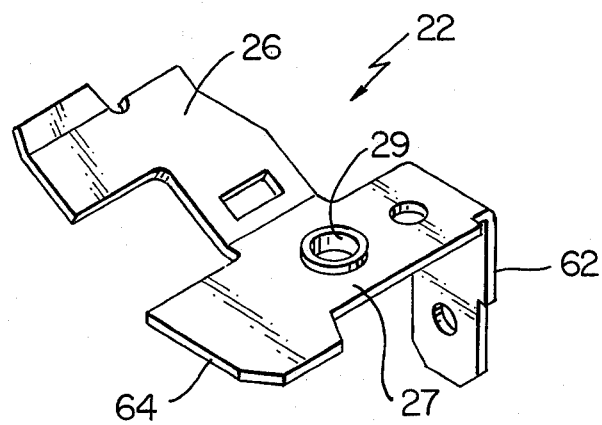
FIG. 8 is a perspective view and illustrates one of the members of the assembly of FIG. 7 in the configuration thereof when the same is initially loaded in the apparatus of FIG. 1.

In this manner, each terminal member 22 having its arm 26 normally in the unfolded condition illustrated in FIG. 8 is adapted to be manually or automatically loaded onto a holding means 34 at station 35 of the apparatus 20 so that the body portion 27 thereof is disposed over the upper end 55 of the punch 56 of the respective holding means 34 and has its leg 62 disposed in the cutout 63 of the upper block 45. When that particular holding means 34 is indexed to the next station 36 or eventually to station 37, a switch blade 24 is adapted to be loaded on the positioning means 61 thereof as illustrated in FIG. 9 so that its lower end 23 is disposed on top of the body portion 27 of the terminal member 22, the main body portion 66 of the switch blade 24 being disposed underneath the foldable arm 26 of the terminal 22 as illustrated in FIG. 10 and being received in a suitable holding recess 67 of the positioning member 61 as illustrated.

Figure 9:
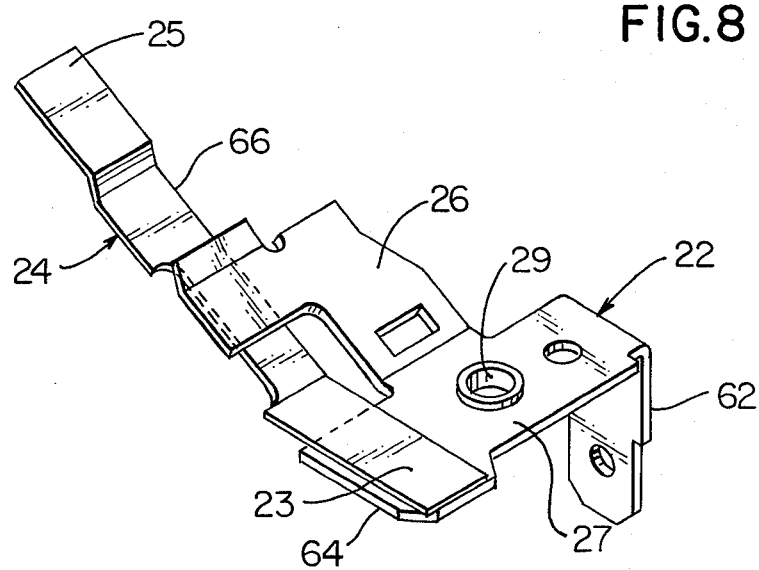
FIG. 9 is a view similar to FIG. 8 and illustrates the other member of the assembly of FIG. 7 in its initial condition when assembled with the member of FIG. 8 in the apparatus of FIG. 1.
Figure 10:
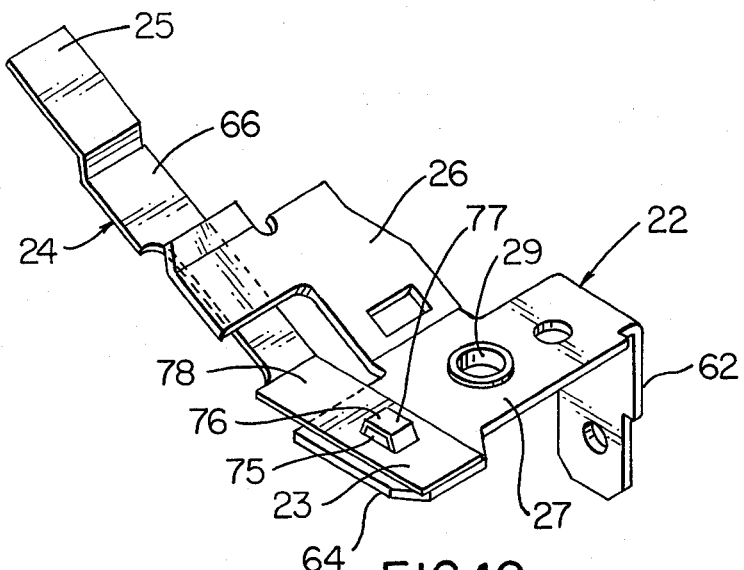
FIG. 10 is a perspective view and illustrates the assembly of FIG. 9 after the apparatus of FIG. 1 has formed the lancing step on the two members of FIG. 9.

The thus assembled terminal member 22 and switch blade 24 in the condition of FIG. 9 are held by the respective holding means 34 to be indexed to the station 38 wherein a unit that is generally indicated by the reference numeral 68 performs the lancing and staking operation thereon to secure the switch blade 24 and terminal member 22 together.

In particular, the lancing and staking unit 68 has a frame means 69, FIGS. 2 and 3, carried by the main frame means 31 of the apparatus 20 and includes a substantially vertically reciprocating head that is generally indicated by the reference numeral 70 and a frame plate 71 disposed spaced beneath the reciprocating head 70 and having an upper surface 72 against which the lower surface 51 of the table or carrier means 32 moves across as illustrated in FIGS. 2 and 3 in order to have its lower surface 51 supported thereto to thereby provide a support function for the particular holding means 34 that has been indexed to the unit 68 and is to be operated on by the head 70 of the unit 68.

The upper surface 72 of the support plate 71 of the frame means 69 of the unit 68 has a pair of arcuate grooves 73 therein and in which the lower ends 53 of the posts 48 of the upper block 45 of the holding means 34 are adapted to freely move so that the upper block 45 of each holding means 34 will have its lower surface 46 maintained against the upper surface 47 of the lower block 43 as illustrated in FIGS. 2, 3 and 4 at the station 38 so that the upper end 55 of the punch 56 is disposed above the combined planar surfaces 54, 60 of the upper block 46. This feature permits the reciprocating head 70 to perform the lancing and staking operation with the punch 56 of the particular holding means 34 at the station 38 in a manner hereinafter set forth.

The reciprocating head 70 of the unit 68 is a single head and has a female die member 74 that cooperates with the punch 56 on a first down stroke of the reciprocating head 70 to cause the end 55 of the punch 56 to lance a part 75 of the body portion 27 of the terminal member 22 through an unblanked part 76 of the end 23 of the switch blade 24 as illustrated in FIG. 10 so that the part 76 of the switch blade 24 has a top portion 77 disposed spaced above the surface 78 of the end 23 of the blade 24 from which the part 76 has been lanced as illustrated in FIG. 10. In this manner, the female die member 74 comprises a first means of the head 70 that performs a lancing and forming step on a first stroke of the head 70.

Figure 11:
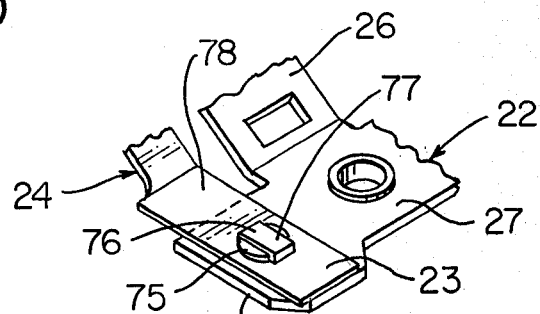
FIG. 11 is a fragmentary perspective view similar to FIG. 10 and illustrates the two members of FIG. 10 after the same have been staked by the apparatus of FIG. 1.

The reciprocating head 70 then moves upwardly relative to the holding means 34 so that an anvil member 79 of the reciprocating head 70 can be then locked in position by a locking member 80 moving over the upper end 81 of the anvil member 79 so that on the second downward stroke of the reciprocating head 70 toward the end 55 of the punch 56, the lower end of the anvil member 79 compacts against the top portion 77 of the lanced part 76 of the switch blade 24 to cause the formed part 75 of the terminal member 22 to spread outwardly against the surface 78 of the switch blade 24 in the manner illustrated in FIG. 11 to thereby securely stake the two members 22 and 24 together. In this manner, the anvil member 79 comprises a second means of the head 70 that performs a staking step on a second stroke of the head 70.

The reciprocating head 70 and its female die member 74 and anvil member 79 perform the above lancing and staking operation on the members 22 and 24 in the manner fully set forth in the aforementioned U.S. Pat. No. 4,035,901 which has been incorporated in this disclosure by the previous reference thereto so that the details of the structure and operation as to how the head 70 reciprocates so that on the first stroke thereof the same performs the lancing operation previously described and on the second stroke thereof performs the staking operation previously described need not be further set forth as such details are fully set forth and claimed in U.S. Pat. No. 4,035,901.

However, in the apparatus set forth in U.S. Pat. No. 4,035,901, the punch member thereon which cooperates with the reciprocating head thereof is stationary and does not form part of a carrier means as uniquely provided by this invention.

After the particular terminal member 22 and switch blade member 24 have been lanced and staked together in the manner previously described by the unit 68 at the station 38 of the apparatus 20, the table or indexible carrier 32 indexes a new holding means 34 to the station 38 to have the unit 68 lance and stake the terminal member 22 and switch blade 24 carried thereby in the manner previously set forth, the previously staked terminal member 22 and switch blade 24 being indexed to the station 39 where a desired operation thereon can take place while the unit 68 is performing its lancing and staking operation.

Figure 12:
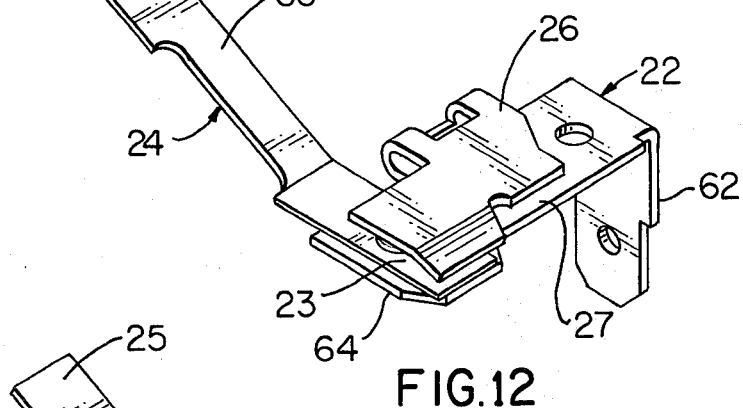
FIG. 12 is a perspective view illustrating the two members of FIG. 11 after the apparatus of FIG. 1 has bent an arm of the terminal member into its final configuration.

Once the carrier means 32 has moved a particular holding means 34 to the station 40, a suitable unit that is generally indicated by the reference numeral 82 folds the arm 26 of the terminal member 22 that is being carried by the particular holding means 34 to its final position as illustrated in FIG. 12 so as to be disposed over the body portion 27 of the terminal member 22.

Once that particular holding means 34 has been indexed by the table 32 to the station 41, a suitable unit that is generally indicated by the reference numeral 83 drives the adjusting screw 28 into the threaded or self-threading opening 29 of the terminal member 22 carried by the holding means 34 so as to position the end 30 of the set screw 28 against the folded arm 26 for subsequent calibration purposes of the complete switch assembly 21.

When the table or indexible carrier means 32 indexes the particular holding means 34 to the station 42, the completed assembly 21 is adapted to be ejected from its holding means 34 in any suitable manner into a hopper (not shown) or the like so that when that particular holding means 34 is subsequently indexed back to the station 35, a new terminal member 22 can be disposed thereon in the manner previously described to have a switch blade 24 subsequently secured thereto in the manner previously described.

However, as the carrier means or table 32 is indexing a particular holding means 34 to the eject station 42, that particular holding means 34 moves across a cam end 84 of the cam member 52 so as to have the lower free ends 53 of the posts 48 cammed upwardly as illustrated in FIGS. 5 and 6 so as to move the upper surface 54 of the upper block 45 substantially co-planar with the top 55 of the punch 56 to fully strip the lanced and staked together terminal member 22 and switch blade 24 from the punch 56 so as to permit the ejecting means (not shown) to remove the completed switch assembly 21 from that particular holding means 34.

Thus, it can be seen that it is a relatively simple method of this invention to form a plurality of switch assemblies 21 with the apparatus 20 made by the method of this invention wherein the apparatus 20 uniquely has the plurality of holding means 34 thereof each provided with a punch 56 that is supported by the indexible table or carrier means 32 to be respectively and serially indexed to and away from the reciprocating head 70 of the unit 68 while cooperating with the head 70 while at the station 38 to perform the lancing and staking operation previously described.

The operation of the apparatus 20 will now be described.

When a particular holding means 34 of the table 32 has been indexed to the station 35 as illustrated in FIG. 1, an operator or automatic means can place the unfolded terminal member 22 of FIG. 8 in position on the top block 45 of the holding means 34 adjacent the positioning means 65 and cutout 63 as previously described. A switch blade 22 is subsequently placed in the recess 67 of the position means 61 at either the station 36 or the station 37 when that particular holding means 34 is indexed thereto by the table or carrier means 32 in a manner well known in the art whereby the end 23 of the switch blade 24 is positioned adjacent the end 64 of the body 27 of the terminal member 22 as illustrated in FIG. 9.

When that particular holding means 34 is subsequently indexed to station 38 of the table 32, the head 70 of the unit 68 is moved vertically downwardly to have the female die member 54 thereof force the switch blade 24 and terminal member 22 downwardly over the end 55 of the punch 56, which extends above the top surface 54, 60 of the top plate 45, so that the punch 56 deforms the part 75 of the terminal 22 through the unblanked part 76 of the switch blade 24 to form the portion 77 of the switch blade 24 above the surface 78 of the blade 24. The head 70 then is raised and on the next down stroke thereof, the anvil member 79 has been locked in place so that the same compresses against the portion 77 of the switch blade 24 to compress outwardly the part 75 of the terminal member 22 in the manner illustrated in FIG. 12 to spread over the surface 78 of the switch blade 24 and thereby stake the same together as illustrated in FIG. 12.

The head 70 of the unit 68 is then raised from the position illustrated in FIG. 2 and the table 32 is indexed to bring a new holding means 34 to the unit 68 while the staked terminal member 22 and switch blade 24 are indexed to station 39 and subsequently to station 40 where the unit 82 folds the arm 26 of the terminal member 22 over the body portion 27 of the terminal member 22 in the manner illustrated in FIG. 13. That particular holding means 34 is subsequently indexed by the table or carrier means 32 to station 41 wherein the unit 83 inserts the adjusting screw 28 in the opening 29 so that the end 30 of the adjusting screw 28 engages against the arm 26 for subsequent calibration thereof in the manner previously set forth.

As the table 32 then indexes that particular holding means 34 from station 41 to station 42, the particular holding means 34 moves across the cam surface 84 of the cam member 52 so that the posts 48 move the top plate 45 upwardly relative to the bottom plate 43 in the manner illustrated in FIGS. 5 and 6 to strip the complete assembly 21 from the top 55 of the punch 56 whereby suitable ejection apparatus, such as a projecting cylinder, air or the like, removes the completed switch assembly 21 from that holding means 34 at the station 42 so that that particular holding means 34 can be subsequently indexed back to the station 35 to again repeat the process previously set forth.

Thus, it can be seen that this invention provides an apparatus for joining two metal members together with a lancing and staking operation that comprises the lancing and forming of a part of one of the members through an unblanked part of the other of the members and thereafter the staking of the formed part of the one member to an adjacent surface means of the other member to secure the members together in abutting relation, the apparatus having a punch and reciprocating head that cooperate together to form the lancing and staking operation on the members. Such apparatus comprises an indexible carrier means for indexing the members to the head for the lancing and staking operation thereon and then away from the head after the lancing and staking operation, the carrier means supporting and carrying the punch therewith.

Accordingly, it can be seen that this invention not only provides an improved apparatus for joining two metal members together with a lancing and staking operation, but also this invention provides an improved method for making such an apparatus.

While the form and method of this invention now preferred have been illustrated and described as required by the Patent Statute, it is to be understood that other forms and method steps can be utilized and still fall within the scope of the appended claims.

What is claimed is:

1. In an apparatus for joining two metal members together with a lancing and staking operation that comprises the lancing and forming of a part of one of said members through an unblanked part of the other of said members and thereafter the staking of said formed part of said one member to an adjacent surface means of said other member to secure said members together in abutting relation, said apparatus having a punch and a reciprocating head that cooperate together to perform said lancing and staking operation on said members, the improvement comprising an indexible carrier means for indexing said members to said head for said lancing and staking operation thereon and then away from said head after said lancing and staking operation, said carrier means supporting and carrying said punch therewith whereby said punch moves with said carrier means relative to said head.

2. An apparatus as set forth in claim 1 wherein said carrier means has positioning means thereon for receiving and holding said members in a positioned relation for said lancing and staking operation.

3. An apparatus as set forth in claim 2 wherein said positioning means hold said members adjacent said punch.

4. An apparatus as set forth in claim 2 wherein said positioning means hold said members against said punch.

5. An apparatus as set forth in claim 2 wherein said positioning means hold said members in an assembly thereof with said one member being disposed against said punch.

6. An apparatus as set forth in claim 1 wherein said carrier means is movable beneath said head.

7. An apparatus as set forth in claim 6 wherein said carrier means is movable in a generally horizontal direction.

8. An apparatus as set forth in claim 1 wherein said carrier means comprises rotatable table means having other punches supported and carried thereby in circumferentially spaced relation to each other and to said first-named punch.

9. An apparatus as set forth in claim 8 wherein said indexible carrier means is adapted to index said lanced and staked members with their respective punch to other operating stations of said apparatus.

10. An apparatus as set forth in claim 9 wherein said carrier means has means for carrying another pair of said members with their respective punch to said head to be lanced and staked while moving said first-named members and their respective punch away from said head after said lancing and staking operation thereof.

11. An apparatus as set forth in claim 1 wherein said one member comprises a terminal member for an electrical switch construction and said other member comprises a flexible switch blade for said switch construction.

12. An apparatus as set forth in claim 1 wherein said head is a single head having a first means that cooperates with said punch to perform said lancing and forming step on a first stroke of said head and having a second means that performs said staking step on a second stroke of said head.

13. An apparatus as set forth in claim 12 wherein said first means of said head comprises a female die member that cooperates with said punch during said first stroke thereof to lance and form said metal members between said female die member and said punch.

14. An apparatus as set forth in claim 13 wherein said second means of said head comprises an anvil member adapted to reciprocate in said female die member, said anvil member being adapted to compact said lanced and formed parts of said metal members between said anvil member and said punch during said second stroke of said head to perform said staking step.

15. An apparatus as set forth in claim 10 wherein said carrier means has a plurality of stripping means respectively and operatively associated with said punches, said apparatus having means for causing each said stripping means to strip its respective pair of said staked members from its respective punch after said second stroke of said head and after said carrier means indexes that respective pair of said staked members away from said head.

16. In a method of making an apparatus for joining two metal members together with a lancing and staking operation that comprises the lancing and forming of a part of one of said members through an unblanked part of the other of said members and thereafter the staking of said formed part of said one member to an adjacent surface means of said other member to secure said members together in abutting relation, said apparatus having a punch and a reciprocating head that cooperate together to perform said lancing and staking operation on said members, the improvement comprising the steps of forming an indexible carrier means for indexing said members to said head for said lancing and staking operation thereon and then away from said head after said lancing and staking operation, and supporting said punch on said carrier means to be carried therewith whereby said punch moves with said carrier means relative to said head.

17. A method of making an apparatus as set forth in claim 16 and including the step of forming said carrier means with positioning means thereon for receiving and holding said members in a positioned relation for said lancing and staking operation.

18. A method of making an apparatus as set forth in claim 17 and including the step of forming said positioning means to hold said members adjacent said punch.

19. A method of making an apparatus as set forth in claim 17 and including the step of forming said positioning means to hold said members against said punch.

20. A method of making an apparatus as set forth in claim 17 and including the step of forming said positioning means to hold said members in an assembly thereof with said one member being disposed against said punch.

21. A method of making an apparatus as set forth in claim 16 and including the step of forming said carrier means to be movable beneath said head.

22. A method of making an apparatus as set forth in claim 21 and including the step of forming said carrier means to be movable in a generally horizontal direction.

23. A method of making an apparatus as set forth in claim 16 and including the steps of forming said carrier means to comprise a rotatable table means, and supporting other punches on said carrier means in circumferentially spaced relation to each other and to said first-named punch.

24. A method of making an apparatus as set forth in claim 23 and including the step of forming said indexible carrier means to be adapted to index said lanced and staked members with their respective punch to other operating stations of said apparatus.

25. A method of making an apparatus as set forth in claim 24 and including the step of forming said carrier means to have means for carrying another pair of said members with their respective punch to said head to be lanced and staked while moving said first-named members and their respective punch away from said head after said lancing and staking operation thereof.

26. A method of making an apparatus as set forth in claim 16 and including the step of forming said one member to comprise a terminal member for an electrical switch construction and said other member to comprise a flexible switch blade for said switch construction.

27. A method of making an apparatus as set forth in claim 16 and including the step of forming said head to be a single head having a first means that cooperates with said punch to perform said lancing and forming step on a first stroke of said head and having a second means that performs said staking step on a second stroke of said head.

28. A method of making an apparatus as set forth in claim 27 and including the step of forming said first means of said head to comprise a female die member that cooperates with said punch during said first stroke thereof to lance and form said metal members between said female die member and said punch.

29. A method of making an apparatus as set forth in claim 28 and including the steps of forming said second means of said head to comprise an anvil member adapted to reciprocate in said female die member, and forming said anvil member to be adapted to compact said lanced and formed parts of said metal members between said anvil member and said punch during said second stroke of said head to perform said staking step.

30. A method of making an apparatus as set forth in claim 25 and including the steps of forming said carrier means to have a plurality of stripping means respectively and operatively associated with said punches, and forming said apparatus with means to cause each said stripping means to strip its respective pair of said staked members from its respective punch after said second stroke of said head and after said carrier means indexes that respective pair of said staked members away from said head.

* * * * *